(12) United States Patent
Yang

(10) Patent No.: US 10,382,907 B2
(45) Date of Patent: Aug. 13, 2019

(54) DEVICE AND METHOD FOR PROVIDING NOTIFICATION MESSAGE ABOUT CALL REQUEST

(71) Applicant: SAMSUNG ELECTRONICS CO., LTD., Suwon-si, Gyeonggi-do (KR)

(72) Inventor: He-jung Yang, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/812,123

(22) Filed: Nov. 14, 2017

(65) Prior Publication Data

US 2018/0139587 A1    May 17, 2018

(30) Foreign Application Priority Data

Nov. 15, 2016  (KR) .................. 10-2016-0152240

(51) Int. Cl.
*H04W 4/80*    (2018.01)
*H04W 4/12*    (2009.01)
(Continued)

(52) U.S. Cl.
CPC .............. *H04W 4/12* (2013.01); *H04L 51/02* (2013.01); *H04L 51/24* (2013.01); *H04M 1/64* (2013.01);
(Continued)

(58) Field of Classification Search
CPC ........... H04M 3/53308; H04M 15/745; H04M 2215/0108; H04M 2203/4536; H04M 1/642; H04M 3/42059; H04M 3/436; H04M 2203/2011; H04M 2203/2072; H04M 1/72583; H04M 7/006; H04M 2207/40; H04M 3/4211; H04M 3/42374;
(Continued)

(56) References Cited

U.S. PATENT DOCUMENTS 5,832,062 A    11/1998 Drake
RE44,293 E     6/2013 Kinoshita
(Continued)

FOREIGN PATENT DOCUMENTS

JP         5245230         7/2013
KR    10-2007-0050279      5/2007

*Primary Examiner* — Quan M Hua
(74) *Attorney, Agent, or Firm* — Nixon & Vanderhye P.C.

(57) ABSTRACT

Provided are an artificial intelligence system for simulating functions and so forth of human brains by using a mechanical learning algorithm. A method, performed by a device, of providing a notification message about a call request may include one or more of receiving the call request from another device, obtaining context information about a situation of a user if a user input accepting the call request is not received within a preset time, determining a reason for a non-response of the user by analyzing the context information, obtaining information about a relationship between the user and another user of the other device, generating a notification message describing the reason for the non-response based on the context information, determining whether to transmit the notification message to the other device based on the reason for the non-response and the information about the relationship, and transmitting the notification message to the other device based on the determination.

18 Claims, 10 Drawing Sheets

"HELLO, MANAGER KIM.
I'M EXERCISING NOW,
SO I'LL CALL YOU BACK LATER."

(51) Int. Cl.
*H04L 12/58* (2006.01)
*H04M 1/725* (2006.01)
*H04M 3/436* (2006.01)
*H04W 68/02* (2009.01)
*H04M 1/64* (2006.01)
*H04W 4/38* (2018.01)
*G06N 20/00* (2019.01)
*H04L 29/08* (2006.01)
*H04M 3/42* (2006.01)

(52) U.S. Cl.
CPC ..... *H04M 1/72569* (2013.01); *H04M 3/4365* (2013.01); *H04W 4/38* (2018.02); *H04W 68/02* (2013.01); *G06N 20/00* (2019.01); *H04L 67/306* (2013.01); *H04M 3/42365* (2013.01); *H04M 2203/2038* (2013.01); *H04M 2203/651* (2013.01)

(58) Field of Classification Search
CPC .. H04M 3/4938; H04M 3/5158; H04M 3/523; H04M 3/53391; H04M 2201/40; H04M 2201/60; H04M 2203/2016; H04M 2203/253; H04M 3/51; H04M 3/533; H04M 3/53333; H04M 3/5335; H04W 4/12

See application file for complete search history.

(56) References Cited

U.S. PATENT DOCUMENTS

| | | | |
|---|---|---|---|
| 9,282,185 B2 | 3/2016 | Shaw | |
| 2003/0100261 A1* | 5/2003 | Gusler | H04M 1/6505 455/18 |
| 2009/0059897 A1* | 3/2009 | Anantharaman | H04L 12/66 370/352 |
| 2009/0124241 A1* | 5/2009 | Krishnaswamy | G06Q 30/02 455/414.2 |
| 2010/0273443 A1* | 10/2010 | Forutanpour | H04L 51/02 455/404.1 |
| 2013/0094637 A1* | 4/2013 | Shaw | H04M 3/42059 379/88.18 |

\* cited by examiner

FIG. 1
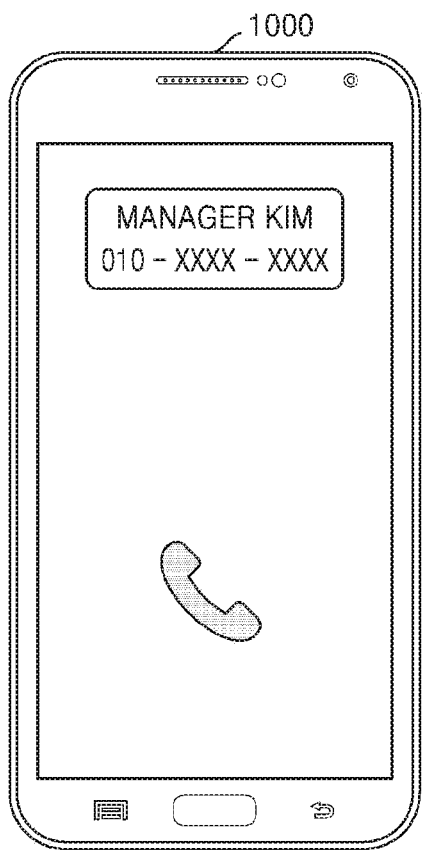

FIG. 4

| CURRENT TIME | EARLIEST ALARM TIME | CHARGING INFORMATION | LATEST ACCESS |
|---|---|---|---|
| AM 04:00 | AM 06:00 | CHARGING DURING 5 HOURS AND 13 MINUTES | 4 HOURS AND 48 MINUTES BEFORE |

TYPE OF REASON FOR NON-RESPONSE: SLEEPING — 410

"□□ IS SLEEPING AND IS TO WAKE UP AT 6:00, SO PLEASE CALL AGAIN AT ABOUT 6:00." — 420

FIG. 5

| CURRENT TIME | HEART RATE | GYROSCOPE SENSOR | LATEST ACCESS |
|---|---|---|---|
| AM 06:00 | HIGH | CONTINUOUSLY MOVE | 24 MINUTES BEFORE |

TYPE OF REASON FOR NON-RESPONSE: EXERCISING — 510

"□□ IS EXERCISING AND IS TO FINISH EXERCISING 36 MINUTES LATER, SO PLEASE CALL AGAIN AT THAT TIME." — 520

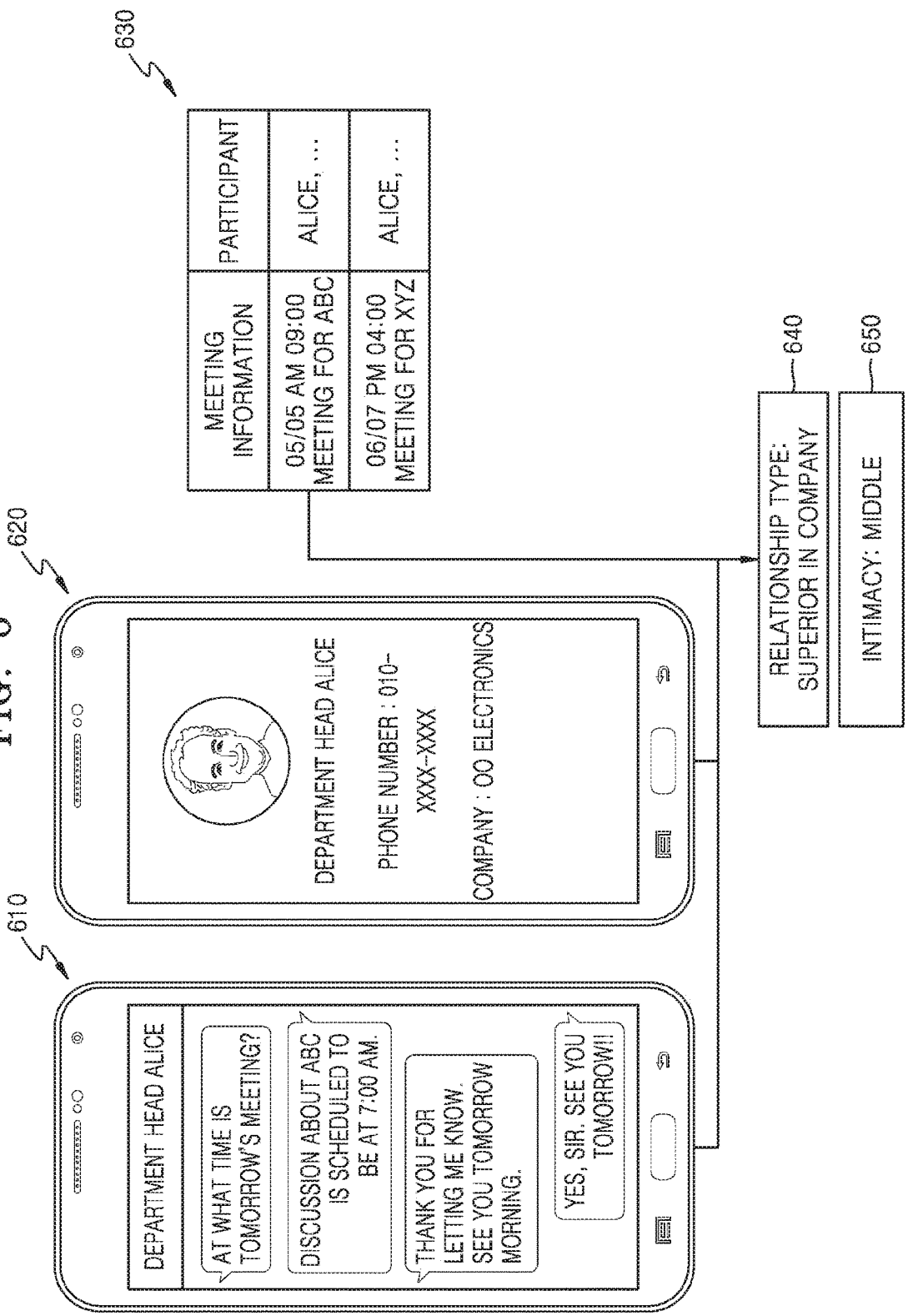

DEVICE AND METHOD FOR PROVIDING NOTIFICATION MESSAGE ABOUT CALL REQUEST

CROSS-REFERENCE TO RELATED APPLICATION

This application is based on and claims priority under 35 U.S.C. Section 119 on Korean Patent Application No. 10-2016-0152240, filed on Nov. 15, 2016, in the Korean Intellectual Property Office, the disclosure of which is incorporated herein in its entirety by reference.

BACKGROUND

1. Field

The present disclosure relates generally to a device and/or method for providing a notification message for a call request, and more particularly, to a device and/or method for transmitting a notification message to another device if a user input for accepting a call request is not received from the other device within a preset time.

2. Description of the Related Art

An artificial intelligence (AI) system is a computer system that implements human-level intelligence, and allows a machine to learn by itself, make decisions, and become smarter, unlike an existing rule-based smart system. As the AI system is used, the AI system has an improved recognition rate and accurately understands a user's preference, such that existing rule-based smart systems are gradually being replaced with deep-learning-based AI systems.

AI technology includes machine learning (deep learning) and element technologies using machine learning.

Machine learning is a technique that classifies/learns characteristics of input data by itself, and element technologies are technologies that simulate a function such as recognition, decision making, etc., of a human brain by using a machine-learning procedure such as deep learning, and include technical fields such as linguistic understanding, visual understanding, inference/prediction, knowledge representation, operation control, and so forth.

The AI technology is employed in various fields. For example, linguistic understanding is a technique that recognizes, and applies/processes human languages/texts, and includes natural language processing, machine interpretation, a conversation system, question and answer processing, voice recognition/synthesis, and so forth. Visual understanding is a technique that recognizes and processes an object in the same manner as a human visual system, and includes object recognition, object tracking, image searching, people recognition, scene understanding, space understanding, image enhancement, etc. Inference/prediction is a technique that determines information and performs logical inference and prediction, and includes knowledge/probability-based inference, optimization prediction, preference-based planning/recommendation, and so forth. Knowledge representation is a technique that automatizes human experience information as knowledge data, and includes knowledge establishment (data creation/classification), knowledge management (data utilization), and the like. Operation control is a technique that controls autonomous driving of a vehicle and motion of a robot, and includes motion control (navigation, collision, driving), manipulation control (action control), and so forth.

Deep learning may also be used for a device to filter harmful images included in video, such that a need exists for a deep learning technique for effectively filtering harmful images that a user does not desire to watch. As an auto response technique for devices has been developed, an auto response message may be transmitted to another device unless a user input for accepting a call request is received within a preset time.

However, conventionally, in a situation where the user cannot receive a call, a device transmits the same message to the other device. Thus, a need exists for a technique for transmitting a notification message about a call request based on context information about a user's situation.

SUMMARY

An example embodiment provides a device and method of providing a notification message about a call request, which is used to describe a reason for a non-response of a user, by analyzing context information about a user's situation.

An example embodiment also provides a device and method of providing a notification message about a call request, which is used to determine whether to transmit the notification message to another device, based on a reason for a non-response of a user and information about a relationship between the user and another user of the other device.

Additional aspects will be set forth in part in the description which follows and, in part, will be apparent from the description, or may be learned by practice of the presented embodiments.

According to a first example aspect of the present disclosure, a device includes a memory having stored therein at least one program, a communicator including communication circuitry configured to receive a call request from another device, and at least one processor configured to provide a notification message about the call request by executing the at least one program, in which the at least one program includes instructions for executing operations of obtaining context information about a situation of the user if a user input accepting the received call request is not received within a preset time, determining a reason for a non-response of the user by analyzing the obtained context information, obtaining information about a relationship between the user and another user of the other device, generating a notification message describing the reason for the non-response based on the context information, determining whether to transmit the notification message to the other device based on the reason for the non-response and the information about the relationship, and transmitting the notification message to the other device based on the determining of whether to transmit the notification message to the other device.

According to a second example aspect of the present disclosure, a method of providing a notification message about a call request by a device includes receiving the call request from another device, obtaining context information about a situation of the user if a user input accepting the received call request is not received within a preset time, determining a reason for a non-response of the user by analyzing the obtained context information, obtaining information about a relationship between the user and another user of the other device, generating a notification message describing the reason for the non-response based on the context information, determining whether to transmit the notification message to the other device based on the reason for the non-response and the information about the relationship, and transmitting the notification message to the other device based on the determining of whether to transmit the notification message to the other device).

According to a third example aspect of the present disclosure, a non-transitory computer-readable recording medium has recorded thereon a program which, when executed by a computer, performs the method according to the second aspect of the present disclosure.

BRIEF DESCRIPTION OF THE DRAWINGS

These and/or other aspects, features, and attendant advantages will become apparent and more readily appreciated from the following description of example embodiments, taken in conjunction with the accompanying drawings in which like reference numerals indicate like parts throughout the several views, and wherein:

FIG. 1 illustrates an example where a device according to an embodiment provides a notification message about a call request from another device;

FIG. 4 illustrates an example where a type of a particular reason for a non-response is determined, according to an embodiment;

FIG. 5 illustrates an example where a type of a particular reason for a non-response is determined, according to an embodiment;

FIG. 6 illustrates an example where relationship type information and intimacy information are obtained, according to an embodiment;

DETAILED DESCRIPTION

Figure 2:
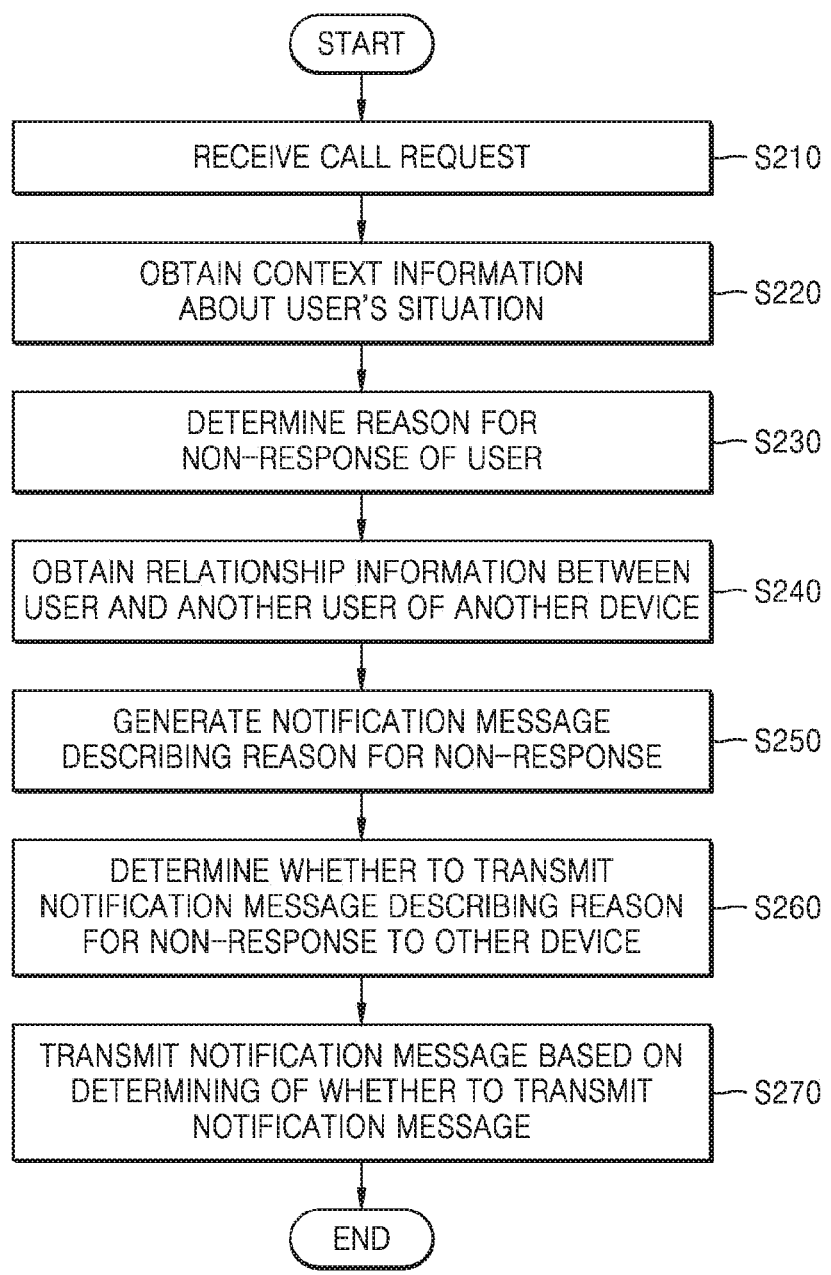
FIG. 2 is a flowchart of a method in which a device transmits a notification message to another device, according to an embodiment.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items.

Hereinafter, example embodiments of the present disclosure will be described in detail with reference to the attached drawings to allow those of ordinary skill in the art to easily carry out the embodiments. However, the present disclosure may be implemented in various forms, and are not limited to the embodiments described herein. To clearly describe the present disclosure, parts that are not associated with the description have been omitted from the drawings, and throughout the specification, identical reference numerals refer to identical parts.

In a description of the embodiments, when a part is connected to another part, the part is not only directly connected to another part but may also be electrically connected to the another part with another device intervening in between. If it is assumed that a certain part includes a certain component, the term 'including' means that the part may further include other components unless a specific meaning opposed to the other component(s) is written.

Hereinafter, example embodiments will be described with reference to the accompanying drawings.

FIG. 1 illustrates an example where an electronic device 1000 (e.g., mobile phone) according to an example embodiment provides a notification message about a call request from another device.

Referring to FIG. 1, the electronic device 1000 may receive the call request from the other device (not shown). The other device may be a mobile phone, or any other type of phone, for instance. If a user input accepting a received call request is not received within a preset time, the device 1000 identifies a reason for a non-response of a user based on context information about a situation of the user and provides a notification message describing the reason for the user's non-response. The device 1000 obtains information about a relationship (or relationship information) between the user and another user of the other device, and if the device 1000 determines that it is not desirable to provide the reason for the non-response, the device 1000 may not transmit the notification message describing the reason for the non-response to the other device.

The electronic device 1000 may also provide a notification message having a proper tone for the relationship by using the relationship information between the user of the device 1000 and the other user that is a user of the other device.

The context information may include, but is not limited to, at least one of: state information of the electronic device 1000, state information of the user of the device 1000, use history information about the user's use of the device 1000, schedule information of the user, and surrounding environment information of the device 1000.

The state information of the device 1000 may include, but is not limited to, mode information of the device 1000 (e.g., a sound mode, a vibrate mode, a mute mode, a power-saving mode, a blocking mode, a multi-window mode, an auto rotation mode, etc.), location information and time information of the device 1000, activation information (e.g., WiFi ON/Bluetooth OFF/GPS ON/NFC ON, etc.) of a communication module, network access state information of the device 1000, charging information of the device 1000, and application information about an application executed in the device 1000 (e.g., identification information of the application, a type of the application, a time of use of the application, a use period of the application, etc.).

The user's state information, regarding a user of electronic device 1000, is information about user's movement and/or life pattern, etc., and may include, but is not limited to, one or more of information about user's walking state, exercising state, driving state, sleeping state, mood state, etc., and user's biometric information about a user's heart rate, pulse, sweat output, blood, muscular motion, finger tremor, etc. The user's state information may be information sensed by the device 1000 and/or another device (not shown) of the user.

The use history information about the user's use of the device 1000 is information about a history of the use of the device 1000 by the user, and may include, but is not limited to, one or more of a history of execution of an application(s), a history of a function executed in the application(s), a user's alarm setting history, a history of calls to and/or from the user, a history of texts to and/or from the user, and so forth. The surrounding environment information of the device 1000 may mean environment information within a predetermined radius from the device 1000, and may include, but is not limited to, one or more of weather information, temperature information, humidity information, illumination information, noise information, sound information, and so forth.

The electronic device 1000 may be, for example, but not limited to, a smart phone, a tablet personal computer (PC), a smart television (TV), a personal digital assistant (PDA), a laptop, a media player, a micro server, a global positioning system (GPS) device, an electronic book (e-book) terminal, a digital broadcasting terminal, a navigation system, a kiosk, an MP3 player, a digital camera, a home appliance, and other mobile or non-mobile computing devices. The device 1000 may also be a wearable device such as a watch, glasses, a hair band, or a ring, which has a communication function and a data processing function. However, the device 1000 may also include any type of devices capable of receiving a call request from another device and transmitting a notification message about the call request to the other device, without being limited to the above-described examples.

The device 1000 may communicate with a server 2000 and another device (not shown) through a predetermined network to use various context information. In this case, the network may include a local area network (LAN), a wide area network (WAN), a value-added network (VAN), a mobile radio communication network, a satellite communication network, and/or a combination thereof, and is a data communication network having a comprehensive meaning, which enables network element entities to communicate with one another smoothly and may include wired Internet, wireless Internet, and/or a mobile wireless communication network. Wireless communication may include, but not limited to, a wireless LAN (wireless fidelity, Wi-Fi), Bluetooth, Bluetooth low energy, ZigBee, Wi-Fi direct (WFD), ultra-wideband (UWB), infrared Data Association (IrDA), near field communication (NFC), and so forth.

FIG. 2 is a flowchart of a method in which the device 1000 transmits a notification message to another device according to an example embodiment.

In operation S210, the device 1000 receives a call request from the other device. The device 1000 executes an application for a call with the other device and receives the call request from the other device through the executed application. For example, the device 1000 may execute a call application or a messenger application and receive the call request from the other device through the executed application.

In operation S220, the device 1000 obtains context information about a user's situation if a user input accepting the received call request is not received within a preset time. Unless the user input accepting the received call request is received from the other device within the preset time, the device 1000 obtains the context information to identify a user's non-responding situation. For example, unless the user input is received by the device 1000 within the preset time (e.g., a certain number of seconds), the device 1000 obtains the context information to identify the non-responding situation for the user of the device 1000. Alternatively, if a user input rejecting the call request is received within the preset time, the device 1000 obtains the context information to identify the non-responding situation.

The user input for accepting the call according to an embodiment may include, but not limited to, at least one of a touch input, a bending input, a voice input, a key input, and a multimodal input. The touch input means a gesture, etc., made by the user on a touch screen to control the device 1000. For example, the touch input may include a tap, a touch & hold, a double tap, a drag, panning, a flick, a drag & drop, and so forth.

When the device 1000 identifies the user's non-responding situation, context information to be used may be determined by learning based on a preset criterion. For example, to identify the user's non-responding situation, supervised learning using predetermined context information as an input value or unsupervised learning discovering a pattern for identifying a user's situation by learning a type of context information needed for identifying the user's situation may be used. In addition, reinforcement learning using a feedback about whether a result of identifying the user's situation based on learning is correct may also be used to identify the user's situation.

In operation S230, the device 1000 determines a reason for a non-response of the user of device 1000 by analyzing the obtained context information.

For example, the device 1000 may determine the reason for the non-response of the user by considering context information including one or more of schedule information of the user, use history information about the user's use of the device 1000, state information of the user sensed by the device 1000, state information of the user sensed by another device of the user, and so forth. For example, the device 1000 may determine that the reason for the user's non-response is that the user is in a meeting with colleagues in a company and thus cannot answer a call. In another example, the device 1000 may determine that the reason for the non-response is that the user does not desire to receive a call from a specific caller even if the user can answer a call.

In operation S240, the device 1000 obtains relationship information between the user of device 1000 and another user of the other device.

In an embodiment, the device 1000 obtains relevant information for identifying a relationship between the user of device 1000 and another user of the other device to determine whether to transmit the notification message to the other device. For example, the relevant information may include at least one of call history information of the user, text history information of the user, contact information of the user, and schedule information of the user. In an example embodiment, the device 1000 obtains the relationship information based on the relevant information. The device 1000 may obtain the relationship information by extracting only information related to the other information from the relevant information. In an example embodiment, relevant information needed for identifying a relationship between the user and the other user may be determined according to learning based on a preset criterion. For example, supervised learning, unsupervised learning, and reinforcement learning may be used to obtain the relationship information.

In operation S250, the device 1000 generates a notification message describing the reason for the non-response based on at least the context information. For example, if the device 1000 determines that the reason for the user's non-response is that the user is in a meeting with colleagues in the company and thus cannot answer a call, the device 1000 may generate a notification message "I cannot answer the call because I'm in a meeting now. Please call me later." The notification message according to an example embodiment may be generated, but not limited to, as a text message and/or a voice message. In addition, the message generated in the text form may be text-to-speech (TSS) converted to obtain a notification message in a voice form. In an embodiment, the device 1000 may generate the notification message having a different tone based on the relationship information. The tone of the notification message will be described with reference to FIG. 7.

In operation S260, the device 1000 determines whether to transmit the notification message describing the reason for the non-response to the other device based on at least the reason for the non-response and the relationship information. In an example embodiment, the device 1000 may determine not to transmit the notification message describing the reason for the non-response to a device of another user to which the user does not desire to provide the reason for the non-response. For example, if confidential information is included in the reason for the non-response, the device 1000 may determine to transmit the notification message describing the reason for the non-response to only a user having a relationship with the user of the device 1000 to which the confidential information is allowed to be notified. For example, the device 1000 may determine to not transmit the notification message describing the reason for the non-response to another user having a bad relationship with the user of the device 1000.

In operation S270, the device 1000 transmits (or does not transmit) the notification message describing the reason for the non-response to the other device based on the determination in S260. If the device 1000 determines to transmit the notification message describing the reason for the non-response to the other device in operation S260, the device 1000 transmits the notification message describing the reason for the non-response to the other device in operation S270. If the device 1000 determines not to transmit the notification message describing the reason for the non-response to the other device in operation S260, the device 1000 does not transmit the notification message describing the reason for the non-response to the other device in operation S270. In an example embodiment, if the device 1000 determines not to transmit the notification message describing the reason for the non-response, the device 1000 may not transmit the notification message or may transmit a preset notification message that does not include the reason for the non-response. For example, in step S260 if the device determines not to transmit the notification message describing the reason(s) for the non-response, the device 1000 in step S270 may transmit a notification message "I cannot answer the call now. Please call me later." to the other device. In an example embodiment, the notification message that does not include the reason for the non-response may be set by default in the device 1000.

Figure 3:
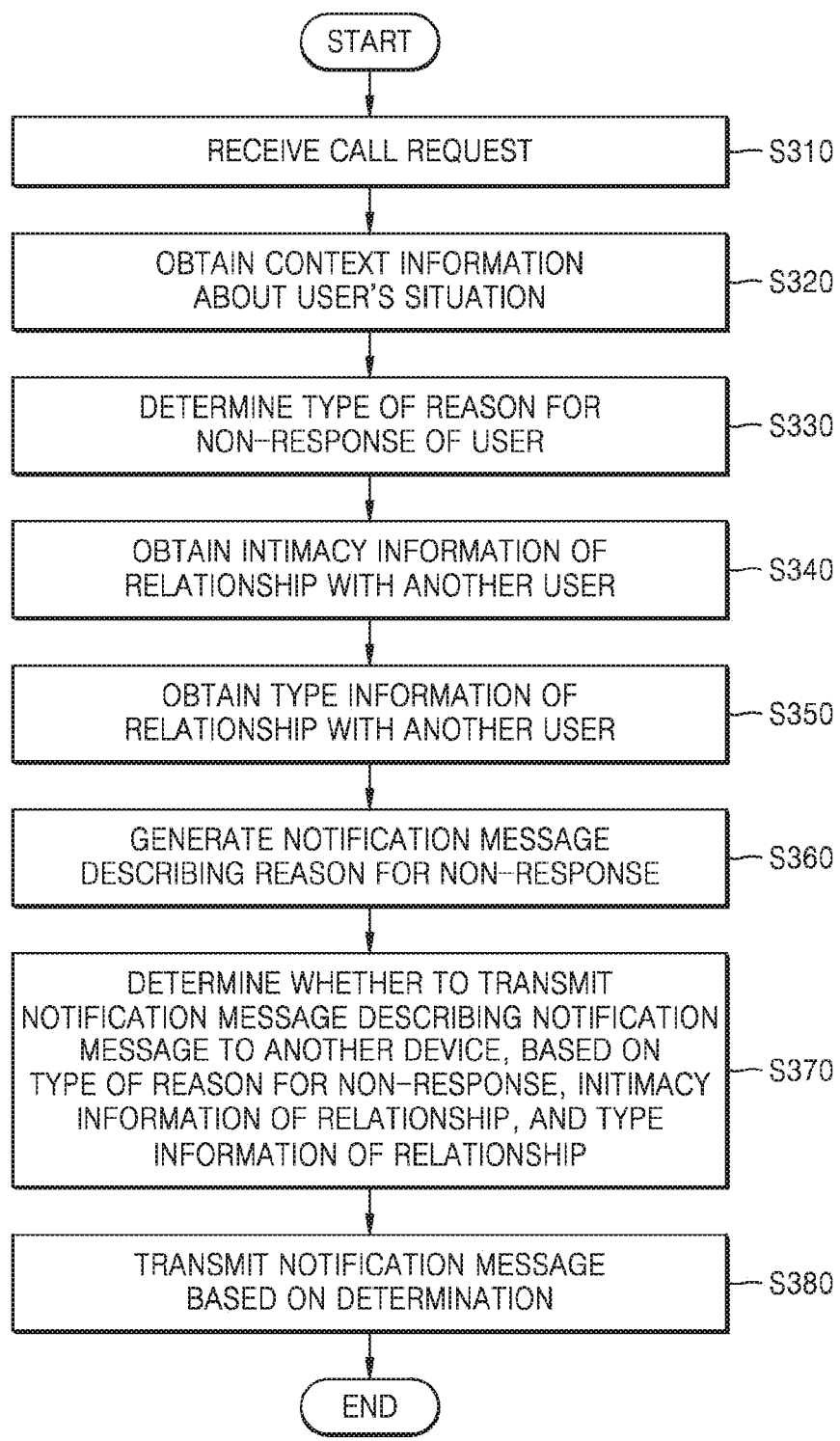
FIG. 3 is a flowchart of a method in which a device transmits a notification message to another device, according to an embodiment.

FIG. 3 is a flowchart of a method in which the device 1000 transmits a notification message to another device according to an example embodiment.

Operations S310 and S320 correspond to operations S210 and S220 of FIG. 2, and thus will not be further described in detail.

In operation S330, the device 1000 determines a type of a reason for a non-response of the user by analyzing the obtained context information.

For example, the device 1000 may determine the type of the reason(s) for the non-response of the user by considering context information including one or more of schedule information of the user, use history information about the user's use of the device 1000, state information of the user sensed by the device 1000, state information of the user sensed by another device of the user, and so forth. If a memo indicating a schedule to do shopping at the time when a call request is received from the other device is recorded in a calendar application, the device 1000 may determine that the type of the reason for the non-response of the user is 'doing shopping' based on the memo recorded in the calendar application.

In operation S340, the device 1000 obtains intimacy information of a relationship (or relationship intimacy information) between the user of device 1000 and another user of the other device. In an example embodiment, the device 1000 obtains relevant information for identifying the relationship intimacy information between the user and another user of the other device to determine whether to transmit the notification message to the other device. For example, the relevant information may include at least one of call history information of the user, text history information of the user, contact information of the user, and schedule information of the user. In an example embodiment, the device 1000 obtains the relationship intimacy information based on the relevant information.

For example, if the number of calls and the number of texts with a particular user are much greater than those with another user, the device 1000 may determine that the user of device 1000 has high intimacy with the particular other user. The device 1000 may obtain the relationship intimacy information by extracting only information related to the other information from the relevant information. In an example embodiment, relevant information needed for identifying the relationship intimacy information between the user and the other user may be determined according to learning based on a preset criterion. For example, supervised learning, unsupervised learning, and reinforcement learning may be used to obtain the relationship intimacy information.

In operation S350, the device 1000 obtains type information of the relationship (or relationship type information) between the user of device 1000 and another user of the other device.

In an example embodiment, the device 1000 obtains relevant information for identifying the relationship type information between the user of device 1000 and another user of the other device to determine whether to transmit the notification message with the reason(s) for non-response to the other device. For example, the relevant information may include at least one of call history information of the user, text history information of the user, contact information of the user, and schedule information of the user. In an example embodiment, the device 1000 obtains the relationship type information based on the relevant information. For example, the device 1000 may obtain the relationship type information by extracting only information related to the other information from the relevant information.

The type of the relationship according to an embodiment may include colleagues, family, friends, a lover, unspecified persons, etc. For example, if the company name of the user is also recorded in the name of another user recorded in a contact application, the device 1000 may determine based on the recording in the contact application that the type of the relationship with the other user is 'colleagues'. In an embodiment, relevant information needed for identifying the relationship type information between the user and the other user may be determined according to learning based on a preset criterion. For example, supervised learning, unsupervised learning, and reinforcement learning may be used to obtain the relationship type information.

In operation S360, the device 1000 generates a notification message describing the reason(s) for the non-response based on the context information.

In operation S370, the device 1000 determines whether to transmit the notification message describing the reason(s) for the non-response to the other device based on one, two, or all three of the type of the reason for the non-response, the relationship intimacy information, and the relationship type information.

In an example embodiment, the device 1000 may determine whether to transmit the notification message describing the reason for the non-response based on the relationship intimacy information. For example, the device 1000 may determine to transmit the notification message describing the reason for the non-response to another device having a high-intimacy relationship with the user and determine not to transmit the notification message describing the reason for the non-response to another device having a low-intimacy relationship with the user. If a call comes from a number that is not stored in the contact application and has no previous call or text history, for example, the device 1000 may determine not to transmit a notification message describing that the user is 'doing an exercise'.

However, in an example embodiment, for a particular type of the reason for the non-response, the device 1000 may determine to transmit a notification message describing a reason for a non-response only to a particular relationship type. For example, if the user is 'in a meeting', the device 1000 may determine to transmit a notification message indicating that the user is in a meeting only to another user having a relationship type 'colleagues'—but not to other relationship types. The device 1000 may also determine not to transmit a notification message describing a particular type of the reason for the non-response to another device of another user having high intimacy.

Operation S380 corresponds to operation S270 of FIG. 2, and thus will not be described in detail.

FIG. 4 illustrates an example where a type of a particular reason for a non-response is determined according to an embodiment.

Referring to FIG. 4, a table 400 may include context information for determining a user's non-responding situation. For example, in the table 400, information such as, but not limited to, current time, the earliest time among set alarm times, a charging history of the device 1000, the latest time the user accesses the device 1000, and so forth may be recorded and stored in memory. The information included in the table 400 according to an embodiment may be set and changed based on learning according to a preset criterion. As shown in FIG. 4, by analyzing context information about a user's situation including the current time being 4:00 am, the earliest time among set alarm times being 6:00 am, a charging time of the device 1000 being 5 hours and 13 minutes, and the latest time the user accesses the device 1000 being 4 hours and 48 minutes before, the device 1000 may determine that a type 410 of a reason for a non-response of the user to the call request is 'sleeping'.

For example, the type 410 of the reason for the non-response may include exercising', 'emergency', resting', 'at table', shopping', 'in a meeting', sleeping, and so forth.

Also, in an example embodiment, the device 1000 may determine the time when a user input accepting a call request may be received, by analyzing the context information. For example, the time when the user input may be received may be predicted using information about a user's life pattern. To this end, data indicating the user's life pattern such as one or more of the wake-up time, sleeping hours, the set alarm time, the exercise time of the user, and so forth may be cumulatively stored by date and time, and the time when the user may answer a call may be predicted using the cumulatively stored data. Data to be used to determine the time when the user input accepting the call request may be received may be set and changed based on learning according to a preset criterion.

In an example embodiment, the device 1000 may generate a notification message describing a reason for a non-response based on the determined time when the user input accepting the call request may be received. For example, if the type 410 of the reason for the non-response determined by the device 1000 is 'sleeping' and the time when the user may answer a call determined by the device 1000 is 6:00 am, then the device 1000 may generate a notification message 420 "User is sleeping now. User is to wake up at 6:00 am, so please call again at about 6:00 am".

FIG. 5 illustrates an example where a type of a particular reason for a non-response is determined according to an example embodiment.

Referring to FIG. 5, the table 500 may include context information for determining a user's non-responding situation. For example, in the table 500, information such as, but not limited to, one or more of the current time, a user's current heart rate, a motion of gyroscope sensor of the device 1000, the latest time the user accesses the device 1000, and so forth may be recorded and stored in memory (e.g., buffer, RAM, ROM, etc.). The information included in the table 500 according to an example embodiment may be set and changed based on learning according to a preset criterion. As shown in FIG. 5, by analyzing context information about a user's situation including the current time being 6:00 am, heart rate being high, continuous movement, and the last access of device 1000 being 24 minutes earlier, the device 1000 may determine that a type 510 of a reason for a non-response of the user to the call request is 'exercising'. For example, user's biometric signal data such as a user's heart rate may be obtained from a sensor of the device 1000 or a sensor of another device of the user, which is linked with the device 1000.

Also, in an example embodiment, the device 1000 may determine the time when a user input accepting a call request may be received, by analyzing the context information. For example, the time when the user input may be received may be predicted using information about a user's life pattern. To this end, data indicating the user's life pattern such as the wake-up time, sleeping hours, the set alarm time, the exercise time of the user, and so forth may be cumulatively stored by date and time, and the time when the user may answer a call may be predicted using the cumulatively stored data. Data to be used to determine the time when the user input accepting the call request may be received may be set and changed based on learning according to a preset criterion.

In an embodiment, the device 1000 may generate a notification message describing a reason for a non-response based on the determined time when the user input accepting the call request may be received. For example, if the type 510 of the reason for the non-response determined by the device 1000 is 'exercising' and the time when the user may answer a call determined by the device 1000 is 6:00 am, or if exercising typically lasts for about an hour, then the device 1000 may generate a notification message 520 "User is exercising now. User is to finish exercising 36 minutes later, so please call again at that time".

FIG. 6 illustrates an example where relationship type information and relationship intimacy information are obtained according to an example embodiment.

Referring to FIG. 6, to identify intimacy of a relationship and a type of the relationship with Alice who is a user of another device having transmitted a call request, the device 1000 collects text history information 610 with Alice, contact information 620 of Alice, schedule information 630 related to Alice, and so forth.

For example, it can be seen that the text history information 610 with Alice includes information about the time of a meeting and information designating Alice as a department head, and a polite expression is used for the text history information 610. It can also be seen that the contact information 620 about Alice includes 'Department Head Alice' stored in a name box and the same company name as that of the user stored in a company box. The schedule information 630 related to Alice also stores information of two events about meetings with participants including Alice. Based on such relevant information related to Alice, the device 1000 may obtain information indicating that a relationship type 640 with Alice is a superior in the company and intimacy 650 with Alice is about middle. In an embodiment, relationship intimacy information and relationship type information between the user and the other user may be identified based on learning according to a deep neural network.

Figure 7:
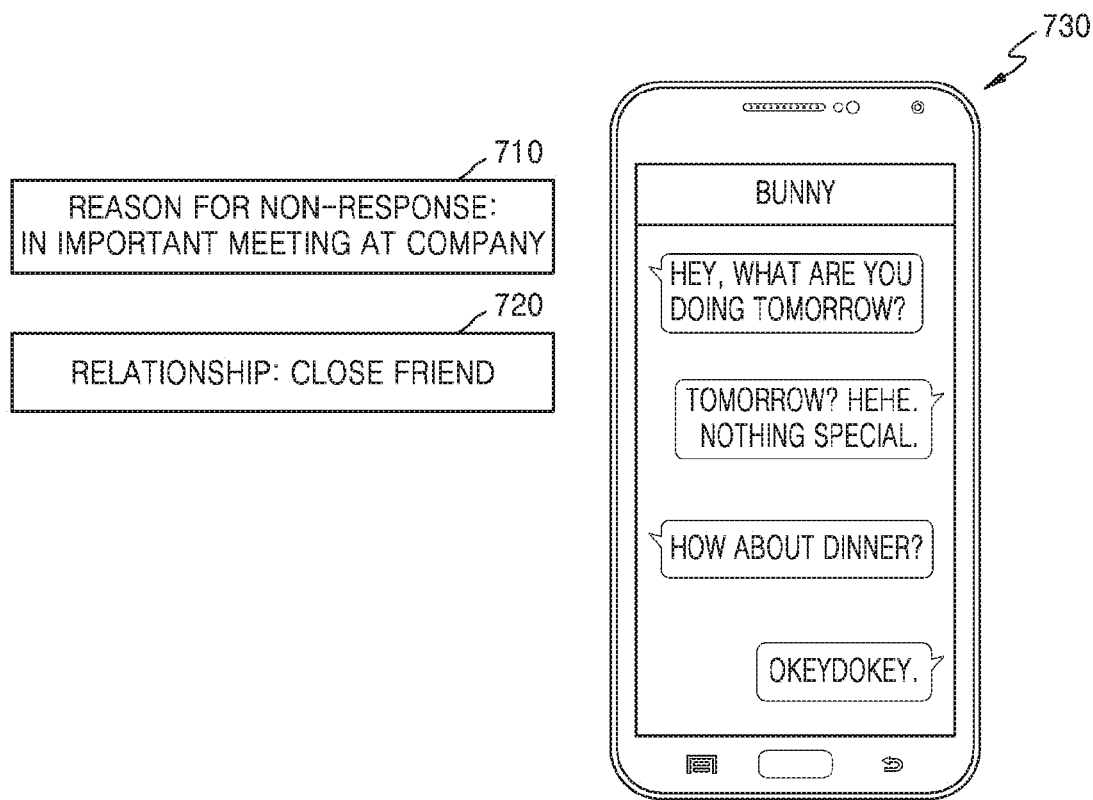
FIG. 7 illustrates an example where a tone of a notification message is determined, according to an embodiment.

FIG. 7 illustrates an example where a tone of a notification message is determined according to an example embodiment.

Referring to FIG. 7, in an example embodiment, the device 1000 generates a notification message 740 based on a reason(s) 710 for a user's non-response to a call request and relationship information 720 with another user of another device having transmitted the call request. For example, the notification message 740 generated by the device 1000 may include a nickname of the another user and a term included in a text history 730 with the another user, and the device 1000 may determine a tone of the notification message 740 based on the relationship information 720. If the reason 710 for the user's non-response determined by analyzing the context information is 'in an important meeting in the company', the device 1000 may not provide the reason 710 for the user's non-response in the notification message 740 even if the relationship information 720 is a close friend. If a name of another user stored in the contact application is 'Bunny', a conversation with the other user included in the text history 730 is written in a declarative style, and abbreviations are used in the conversation, then the device 1000 may generate a notification message that includes a nickname of the other user and does not use polite expression.

In an example embodiment, the device 1000 may generate a notification message by using personal information including a user's gender and/or age, etc. For example, if the user is a woman in her twenties, a notification message "Bunny, I can't answer the call. Call back later~." may be generated.

Figure 8:
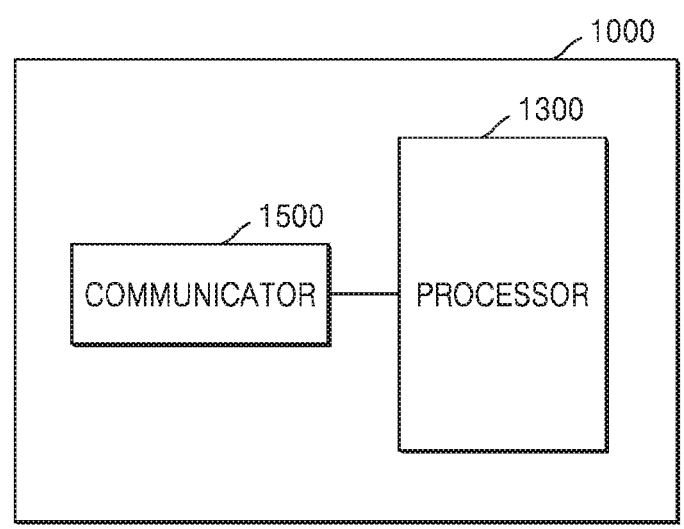
FIGS. 8 and 9 are block diagrams of a device according to an embodiment.
Figure 9:
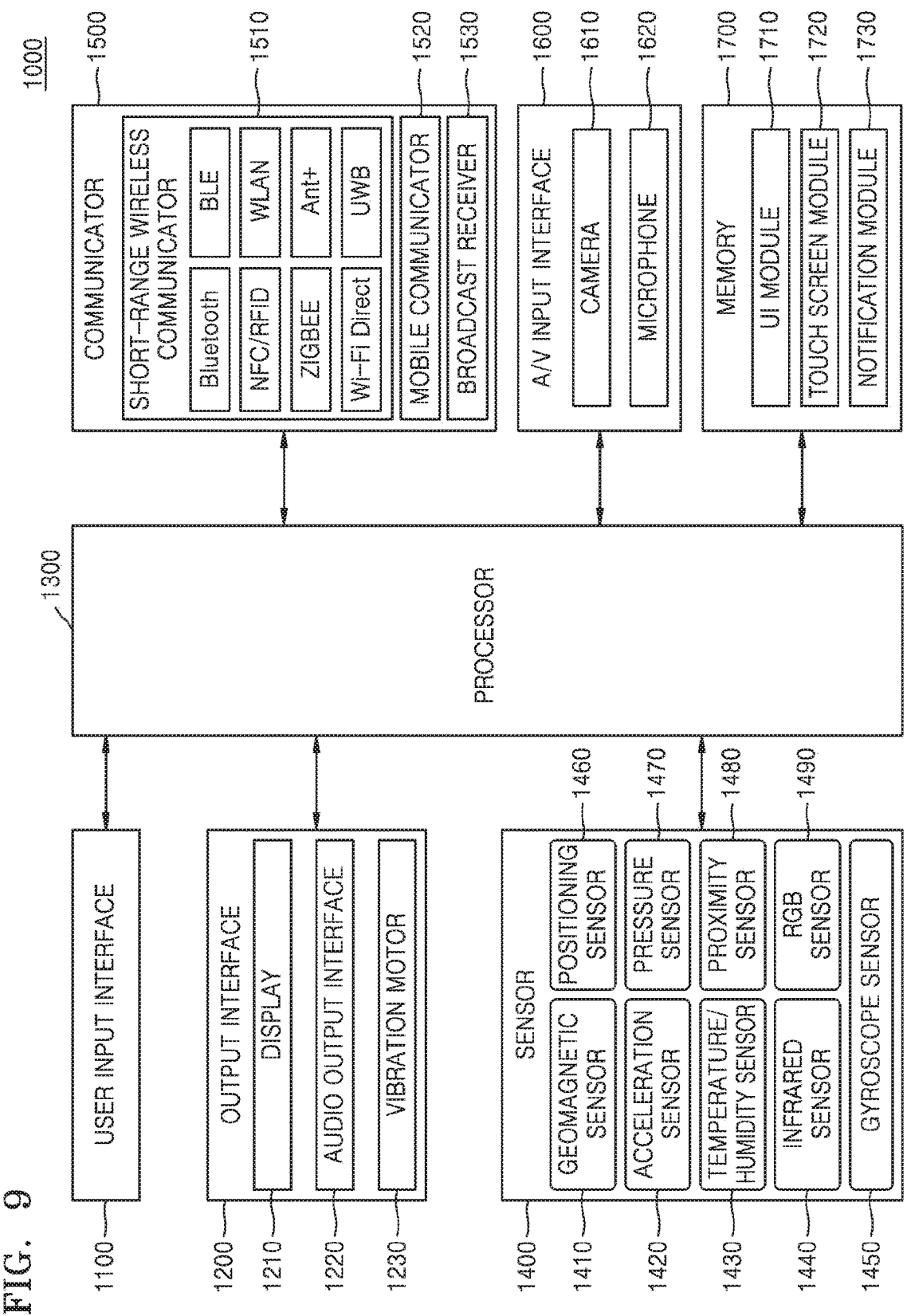

FIGS. 8 and 9 are block diagrams of the device 1000 according to an example embodiment.

As shown in FIG. 8, the electronic device 1000 according to an example embodiment may include a processor 1300, including processing circuitry, and a communicator 1500 that includes communication circuitry. However, all of the elements shown in FIG. 8 are not essential elements of the device 1000. More elements or less elements than those shown in FIG. 8 may be used to implement the device 1000.

For example, as shown in FIG. 9, the device 1000 according to an example embodiment may include a user input interface 1100, an output interface 1200, a sensor 1400, an A/V input interface 1600, and a memory 1700, in addition to the processor 1300 and the communicator 1500.

The user input interface 1100 is an interface through which a user inputs data for controlling the device 1000. For example, the user input interface 1100 may include, but not limited to, a keypad, a dome switch, a touch pad and/or touch screen (a capacitive overlay type, a resistive overlay type, an infrared beam type, a surface acoustic wave type, an integral strain gauge type, a piezoelectric effect type, etc.), a jog wheel, a jog switch, etc.

The user input interface 1100 is configured to receive a user input accepting a call request, if the user so desires, when the device 1000 receives the call request from another device.

The output interface 1200 outputs an audio signal, a video signal, and/or a vibration signal, and may include a display 1210, an audio output interface 1220, and a vibration motor 1230.

The display 1210 (e.g., LCD, LED, and/or OLED display) displays information processed by the device 1000. For example, the display 1210 may display a user interface for accepting the call request from the other device.

The audio output interface 1220 outputs audio data received from the communicator 1500 and/or stored in the memory 1700. The audio output interface 1220 outputs an audio signal related to a function (e.g., a call signal receiving sound, a message receiving sound, an alarm sound, etc.) performed in the device 1000.

The processor 1300 controls an overall operation of the device 1000. For example, the processor 1300 may control the user input interface 1100, the output interface 1200 including the display 1210, interface 1220, and motor 1230, the sensor 1400, the communicator 1500, and the A/V input interface 1600 by executing program(s) stored in the memory 1700. The processor 1300 executes a function(s) of the device 1000 disclosed in FIGS. 1 through 13 by executing programs stored in the memory 1700. The processor 1300 may include at least one processor, including processing circuitry. The processor 1300 may include a plurality of processors or one processor in an integrated form depending on a function and a role thereof.

In an example embodiment, the processor 1300 may receive a call request from another device through the communicator 1500. In an example embodiment, the processor 1300 obtains context information about a user's situation if a user input accepting the received call request is not received within a preset time.

In an example embodiment, the processor 1300 determines a reason for a user's non-response to the call request by analyzing the context information about the user's situation. Also, in an example embodiment, the processor 1300 determines a type of the reason for the non-response of the user by analyzing the context information. In an embodiment, the processor 1300 obtains relationship information between the user and another user of the other device. In an example embodiment, the processor 1300 may obtain relationship type information and relationship intimacy information between the user and the other user.

In an example embodiment, the processor 1300 generates a notification message describing the reason for the non-response based on the context information. In an embodiment, the processor 1300 may determine the time when a user input accepting the call request may be received, by analyzing the context information, and generate a notification message describing the reason for the non-response based on the determined time.

In an example embodiment, the processor 1300 may determine whether to transmit the notification message describing the reason for the non-response to the other device based on the reason for the non-response and/or the relationship information and determine whether to transmit the notification message describing the reason for the non-response to the other device based on the type of the reason for the non-response and/or the relationship information. In an example embodiment, the processor 1300 may determine whether to transmit the notification message describing the reason for the non-response to the other device based on the type of the reason for the non-response, the relationship intimacy information, and the relationship type information.

In an example embodiment, the processor 1300 may control the communicator 1500 to transmit the notification message to the other device based on the determination. For example, if the processor 1300 determines to transmit the notification message describing the reason for the non-response to the other device, the processor 1300 may control the communicator 1500 to transmit the notification message describing the reason(s) for the non-response to the other device. If the processor 1300 determines not to transmit the notification message describing the reason for the non-response to the other device, the processor 1300 may control the communicator 1500 to not transmit the notification message describing the reason for the non-response to the other device.

In an example embodiment, if the processor 1300 determines to not transmit the notification message describing the reason for the non-response to the other device, the processor 1300 may control the communicator 1500 to not transmit the notification message or to transmit a preset notification message that does not include the reason for the non-response. In an example embodiment, the processor 1300 may determine a tone of the notification message based on the relationship information. The processor 1300 according to an example embodiment learns a criterion for determining whether to transmit the notification message to the other device based on a reaction of the user or another user after the processor 1300 transmits the notification message.

The sensor(s) 1400 senses a state of the device 1000, a user's state, and/or a surrounding state of the device 1000, and delivers sensed information to the processor 1300. The sensor 1400 may be used to generate a part of context information indicating a surrounding situation of the user or the device 1000.

The sensor 1400 may include, but not limited to, at least one of a magnetic sensor 1410, an acceleration sensor 1420, a temperature/humidity sensor 1430, an infrared sensor 1440, a gyroscope sensor 1450, a positioning sensor (e.g., a global positioning system (GPS)) 1460, a pressure sensor 1470, a proximity sensor 1480, and a red/green/blue (RGB) sensor (or an illuminance sensor) 1490. A function of each sensor may be intuitively construed from a name of each sensor by those of ordinary skill in the art, and thus will not be described in detail.

The communicator 1500 may include one or more elements that enable the device 1000 to communicate with another device (not shown) and the server 2000. The other device (not shown) may be, but not limited to, a computing electronic device (e.g., smart phone) such as the device 1000 or a sensing device. For example, the communicator 1500, including circuitry, may include a short-range wireless communicator 1510, a mobile communicator 1520, and/or a broadcasting receiver 1530.

The short-range wireless communicator 1510, including communication circuitry, may include, but not limited to, a Bluetooth Low Energy (BLE) communicator, a near field communication (NFC) unit, a wireless local area network (WLAN) (WiFi) communicator, a ZigBee communicator, an infrared Data Association (IrDA) communicator, a WiFi Direct (WFD) communicator, an ultra-wideband (UWB) communicator, and an Ant+ communicator.

The mobile communicator 1520, including communication circuitry, transmits and receives a radio signal to and from at least one of a base station, an external terminal, and/or a server over a mobile communication network. Herein, the radio signal may include various forms of data other to transmission/reception of a voice call signal, a video communication call signal, or a text/multimedia message.

The broadcasting receiver 1530, including circuitry, receives a broadcast signal and/or broadcasting-related information from an external source through a broadcasting channel. The broadcasting channel may include a satellite channel and/or a terrestrial channel. According to implementation examples, the device 1000 need not include the broadcasting receiver 1530.

In an example embodiment, the communicator 1500 may receive a call request from the other device and/or transmit a notification message about the call request to the other device.

In an example embodiment, the communicator 1500 may generate the notification message about the call request and transmit and receive information needed for transmitting the notification message to the other device to and from another device (not shown) and the server 2000. For example, the other device may be another device of the user of the device 1000, and the other device of the user may be a wearable device for sensing a user's state.

The A/V input interface 1600 inputs an audio signal and/or a video signal, and may include a camera 1610, a microphone 1620, and so forth. The camera 1610 obtains an image frame such as a still image or a moving image in a video communication mode or a photographing mode through an image sensor. The image captured by the image sensor is processed by the processor 1300 or a separate image processor (not shown). For example, the image captured by the camera 1610 may be used as user's context information.

The microphone 1620 receives an external audio signal and processes the received signal into electric voice data. For example, the microphone 1620 may receive an audio signal from an external device and/or the user. The microphone 1620 uses various noise cancellation algorithms for canceling noise generated during reception of the external audio signal.

The memory 1700 stores programs for processing and control of the processor 1300 and data input to or output from the device 1000.

The memory 1700 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The programs stored in the memory 1700 may be classified into a plurality of modules depending on a function thereof, e.g., a user interface (UI) module 1710, a touch screen module 1720, a notification module 1730, and so forth.

The UI module 1710 provides a specialized UI or graphic UI (GUI) interworking with the device 1000 for each application. The touch screen module 1720 senses a touch gesture of a user on a touch screen and delivers information about the touch gesture to the processor 1300. The touch screen module 1720 according to an embodiment recognizes and analyzes a touch code. The touch screen module 1720 is configured with separate hardware including a processor.

The notification module 1730 generates a signal for notifying of an occurrence of an event of the device 1000. Examples of the event occurring in the device 1000 may include key signal input, and so forth. The notification module 1730 outputs a notification signal in the form of a video signal through the display 1210, in the form of an audio signal through the audio output interface 1220, and/or in the form of a vibration signal through the vibration motor 1230.

Figure 10:
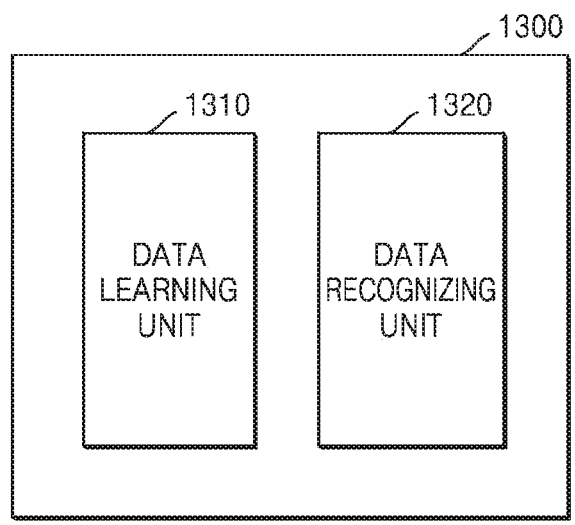
FIG. 10 is a block diagram of a processor according to an embodiment.

FIG. 10 is a block diagram of the processor 1300 according to an example embodiment of the present disclosure.

Referring to FIG. 10, the processor 1300, including processing circuitry, according to an example embodiment may include a data learning unit 1310 and a data recognizing unit 1320.

The data learning unit 1310, including data leaning circuitry, generates a notification message describing a reason(s) for a non-response and learns a criterion for determining whether to transmit the notification message to another device. The data learning unit 1310 learns a criterion for determining which data is to be used to generate a notification message describing a predetermined reason for a non-response and to determine whether to transmit the notification message to the other device, and a criterion about how to determine which reason is to be described in the notification message and whether to transmit the notification message to the other device by using the data. The data learning unit 1310 obtains data to be used for learning and applies the obtained data to a data recognition model to be described later, thereby learning the criterion for generating the notification message describing the reason for the non-response and determining whether to transmit the notification message to the other device.

While it has been described with reference to FIGS. 1 through 9 that operations such as obtaining context information, obtaining relationship information, obtaining relationship intimacy information, obtaining relationship type information, determining a reason for a non-response, determining a type of the reason for non-response, generating the notification message, determining whether to transmit the notification message, and determining a tone of the notification message are performed separately, the present disclosure is not limited thereto. At least two operations among obtaining context information, obtaining relationship information, obtaining relationship intimacy information, obtaining relationship type information, determining a reason for a non-response, determining a type of the reason for non-response, generating the notification message, determining whether to transmit the notification message, and determining a tone of the notification message may be performed based on learning according to a preset criterion.

The data recognizing unit 1320, including data recognizing circuitry, generates the notification message describing the reason for the non-response and determines whether to transmit the notification message to the other device, based on the data. The data recognizing unit 1320 generates the notification message describing the reason for the non-response from predetermined data and determines whether to transmit the notification message to the other device by using a learned data recognition model. The data recognizing unit 1320 obtains data according to the criterion that is preset by learning and uses the data recognition model with the obtained data as an input value, thereby generating the notification message describing the reason for the non-response and determining whether to transmit the notification message to the other device based on the obtained data. A result output from the data recognition model with the obtained data as the input value may be used to update the data recognition model.

At least one of the data learning unit 1310 and the data recognizing unit 1320 may be manufactured in the form of at least one hardware chip and mounted on the device. For example, at least one of the data learning unit 1310 and the data recognizing unit 1320 may be manufactured in the form of a dedicated hardware chip for artificial intelligence (AI), or may be manufactured as a part of an existing general-purpose processor (e.g., a central processing unit (CPU), or an application processor) or a dedicated graphic processor (e.g., a graphic processing unit (GPU)) and mounted on various electronic devices.

In this case, the data learning unit 1310 and the data recognizing unit 1320 may be mounted on one device or on separate devices. For example, one of the data learning unit 1310 and the data recognizing unit 1320 may be included in one device, and the other may be included in a server. The data learning unit 1310 and the data recognizing unit 1320 may be connected in a wired or wireless manner, such that model information established by the data learning unit 1310 may be provided to the data recognizing unit 1320 or data input to the data recognizing unit 1320 may be provided to the data learning unit 1310 as additional learning data.

Meanwhile, at least one of the data learning unit 1310 and the data recognizing unit 1320 may be implemented with a software module. When at least one of the data learning unit 1310 and the data recognizing unit 1320 may be implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 11:
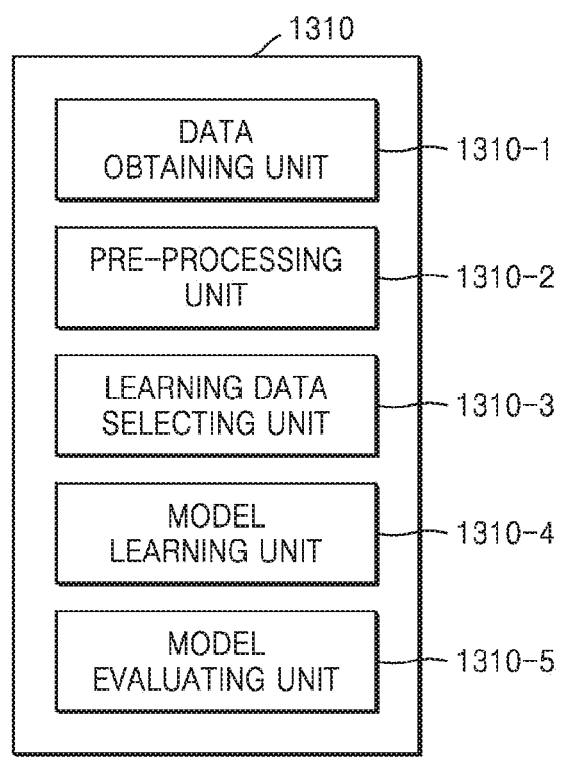
FIG. 11 is a block diagram of a data learning unit according to an embodiment.

FIG. 11 is a block diagram of the data learning unit 1310 according to an example embodiment.

Referring to FIG. 11, the data learning unit 1310 according to some embodiments may include a data obtaining unit 1310-1, a pre-processing unit 1310-2, a learning data selecting unit 1310-3, a model learning unit 1310-4, and a model evaluating unit 1310-5.

The data obtaining unit 1310-1 obtains data needed for generating a notification message describing a reason for a non-response and determining whether to transmit the notification message to the other device. The data obtaining unit 1310-1 obtains data needed for learning for generating the notification message describing the reason for the non-response and determining whether to transmit the notification message to the other device.

For example, the data obtaining unit 1310-1 may obtain speech data, video data, text data, and/or biometric signal data. The data obtaining unit 1310-1 may receive data through an input device (e.g., a microphone, a camera, a sensor, etc.) of the device 1000. Alternatively, the data obtaining unit 1310-1 obtains data through an external device capable of communicating with the device 1000.

Alternatively, the data obtaining unit 1310-1 obtains data through a server capable of communicating with the device 1000.

For example, the data obtaining unit 1310-1 may receive input of context information about a user's situation. The context information may include schedule information of the user, use history information about the user's use of the device 1000, state information of the user sensed by the device 1000, state information of the user sensed by an external device, state information of the device, and so forth.

In an example embodiment, the user's state information may include user's biometric signal data, and the data obtaining unit 1310-1 may receive input of the biometric signal data of the user through an external device capable of communicating with a sensor of the device 1000 including the data learning unit 1310 or the device including the data learning unit 1310.

For example, the data obtaining unit 1310-1 may receive one or more of user's call history information, user's text history information, user's contact information, user's schedule information, and so forth to determine a relationship between the user and the other user.

The pre-processing unit 1310-2 pre-processes the obtained data to use the obtained data in learning for generating the notification message describing the reason for the non-response and determining whether to transmit the notification message to the other device. The pre-processing unit 1310-2 processes the obtained data into a preset format, such that the model learning unit 1310-4 may use the obtained data in learning for generating the notification message describing the reason for the non-response and determining whether to transmit the notification message to the other device.

The learning data selecting unit 1310-3 selects data needed for learning from pre-processed data. The selected data may be provided to the model learning unit 1310-4. The learning data selecting unit 1310-3 selects data needed for learning among the pre-processed data according to a preset criterion for generating the notification message describing the reason for the non-response and determining whether to transmit the notification message to the other device. The learning data selecting unit 1310-3 may also select data according to a criterion that is preset by learning of the model learning unit 1310-4.

For example, data about a user's life pattern may be selected to generate a notification message describing a reason for a non-response and determine whether to transmit the notification message to the other device. For example, data about the user's life pattern may be selected from among cumulatively stored data such as the wake-up time, sleeping hours, the exercise time of the user, a biometric signal during a user's exercise, etc.

The model learning unit 1310-4 learns a criterion about how to determine which reason is to be described in the notification message and whether to transmit the notification message to the other device. The model learning unit 1310-4 learns a criterion about which learning data is to be used for generating the notification message describing the reason for the non-response and whether to transmit the notification message to the other device.

The model learning unit 1310-4 may cause a data recognition model used to generate the notification message describing the reason for the non-response and to determine whether to transmit the notification message to the other device to learn the learning data. In this case, the data recognition model may be previously established. For example, the data recognition model may be previously established using input basic learning data (e.g., a user's text history, etc.).

The data recognition model may be established based on one or more of an application field of the recognition model, a purpose of learning, computer performance of a device, etc. The data recognition model may be based on, for example, a neural network. For example, a model such as, but not limited to, a deep neural network (DNN), a recurrent neural network (RNN), a bidirectional recurrent deep neural network (BRDNN), or the like may be used as the data recognition model.

Various embodiments, if there are a plurality of data recognition models established in advance, the model learning unit 1310-4 determines a data recognition model having a high correlation between input learning data and basic learning data as a data recognition model to be learned. In this case, the basic learning data may be classified in advance according to a data type, and the data recognition model may be established in advance for each data type. For example, the basic learning data may be classified depending on various criteria such as a region where learning data is generated, a time in which learning data is generated, a size of learning data, a genre of learning data, a generator of learning data, a type of an object in learning data, and so forth.

The model learning unit 1310-4 may learn the data recognition model using a learning algorithm such as error back-propagation or gradient descent.

The model learning unit 1310-4 causes the data recognition model to learn using supervised learning having learning data as an input value. The model learning unit 1310-4 may cause the data recognition model to learn using unsupervised learning in which the data recognition model discovers a criterion for generating the notification message describing the reason for the non-response and determining whether to transmit the notification message, by learning a type of data needed for generating the notification message describing the reason for the non-response and determining whether to transmit the notification message, without separate supervision. The model learning unit 1310-4 learns the data recognition model using reinforcement learning based on a feedback about whether a result of generating the notification message and determining whether to transmit the notification message is correct or not based on learning.

For example, based on a reaction of a user of a device having transmitted the notification message describing the reason for the non-response or another user of another device having received the notification message with respect to the notification message after the notification message is transmitted, the model learning unit 1310-4 may learn a criterion for determining whether to transmit the notification message to the other device.

Once the data recognition model is learned, the model learning unit 1310-4 stores the learned data recognition model. In this case, the model learning unit 1310-4 stores the learned data recognition model in a memory of an electronic device 1000 including the data recognizing unit 1320. Alternatively, the model learning unit 1310-4 stores the learned data recognition model in a memory of an electronic device including the data recognizing unit 1320 to be described later. Alternatively, the model learning unit 1310-4 stores the learned data recognition model in a memory of a server wiredly or wirelessly connected with an electronic device.

In this case, for example, the memory in which the learned data recognition model is stored may also store an instruction or data related to at least one other element of the electronic device. The memory may also store software and/or programs. The program may include a kernel, middleware, an application programming interface (API), and/or an application program (or "application"), and the like.

If a recognition result output after input of evaluation data to the data recognition model fails to satisfy a predetermined criterion, the model evaluating unit 1310-5 may cause the model learning unit 1310-4 to learn again. In this case, the evaluation data may be preset data for evaluating the data recognition model.

For example, the evaluation data may be data including a secret of the user, and if a recognition result output from the evaluation data is a result that reveals the secret, the model evaluating unit 1310-5 causes the model learning unit 1310-4 to learn again. For example, the model evaluating unit 1310-5 may evaluate that the predetermined criterion is not satisfied if among recognition results of the learned data recognition model about evaluation data, the number or rate of evaluation data having inaccurate recognition results exceeds a preset threshold value. For the predetermined criterion being defined as a rate of 2%, for example, if the learned data recognition model outputs wrong recognition results for 20 or more evaluation data among a total of 1000 evaluation data, then the model evaluating unit 1310-5 may evaluate that the learned data recognition model is not proper.

If there are a plurality of learned data recognition models, the model evaluating unit 1310-5 evaluates whether each learned data recognition model satisfies the predetermined criterion, and determines a learned data recognition model satisfying the predetermined criterion as a final data recognition model. In this case, if a plurality of learned data recognition models satisfy the predetermined criterion, the model evaluating unit 1310-5 determines preset any one model or a predetermined number of models as a final data recognition model or final data recognition models in a higher evaluation grade order.

At least one of the data obtaining unit 1310-1, the pre-processing unit 1310-2, the learning data selecting unit 1310-3, the model learning unit 1310-4, and the model evaluating unit 1310-5 may be manufactured in the form of at least one hardware chip and mounted on the electronic device. For example, at least one of the data obtaining unit 1310-1, the pre-processing unit 1310-2, the learning data selecting unit 1310-3, the model learning unit 1310-4, and the model evaluating unit 1310-5 may be manufactured in the form of a dedicated hardware chip for AI, or may be manufactured as a part of an existing general-purpose processor (e.g., a CPU or an application processor) or a dedicated graphic processor (e.g., a GPU) and mounted on various electronic devices.

The data obtaining unit 1310-1, the pre-processing unit 1310-2, the learning data selecting unit 1310-3, the model learning unit 1310-4, and the model evaluating unit 1310-5 may be mounted on one electronic device or on separate electronic devices, respectively. For example, some of the data obtaining unit 1310-1, the pre-processing unit 1310-2, the learning data selecting unit 1310-3, the model learning unit 1310-4, and the model evaluating unit 1310-5 may be included in the electronic device or some others thereof may be included in a server.

At least one of the data obtaining unit 1310-1, the pre-processing unit 1310-2, the learning data selecting unit 1310-3, the model learning unit 1310-4, and the model evaluating unit 1310-5 may be implemented with a software module. When at least one of the data obtaining unit 1310-1, the pre-processing unit 1310-2, the learning data selecting unit 1310-3, the model learning unit 1310-4, and the model evaluating unit 1310-5 is implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 12:
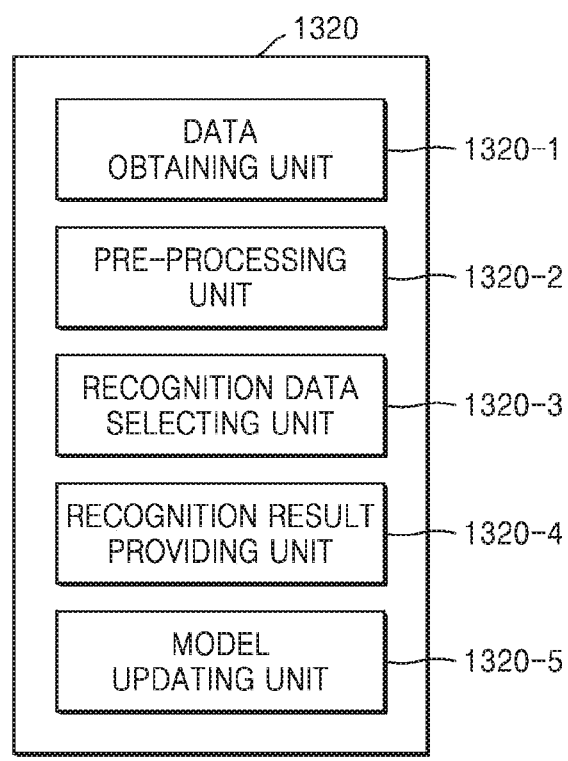
FIG. 12 is a block diagram of a data recognizing unit according to an embodiment.

FIG. 12 is a block diagram of the data recognizing unit 1320, including data recognizing circuitry, according to an example embodiment.

Referring to FIG. 12, the data recognizing unit 1320 according to an example embodiment may include a data obtaining unit 1320-1, a pre-processing unit 1320-2, a recognition data selecting unit 1320-3, a recognition result providing unit 1320-4, and a model updating unit 1320-5, each of which may include circuitry.

The data obtaining unit 1320-1 obtains data needed for generating the notification message describing the reason for the non-response and determining whether to transmit the notification message to the other device, and the pre-processing unit 1320-2 pre-processes the obtained data such that the obtained data may be used to generate the notification message describing the reason for the non-response and to determine whether to transmit the notification message to the other device. The pre-processing unit 1320-2 processes the obtained data into a preset format, such that the recognition result providing unit 1320-4 may use the obtained data to generate the notification message describing the reason for the non-response and to determine whether to transmit the notification message.

The recognition data selecting unit 1320-3 selects data needed for generating the notification message describing the reason for the non-response and determining whether to transmit the notification message to the other device. The selected data may be provided to the recognition result providing unit 1320-4. The recognition data selecting unit 1320-3 selects the entire pre-processed data or a part thereof, according to a preset criterion for generating the notification message describing the reason for the non-response and determining whether to transmit the notification message to the other device. The recognition data selecting unit 1320-3 may also select data according to a criterion that is preset by learning of the model learning unit 1310-4.

The recognition result providing unit 1320-4 generates the notification message describing the reason for the non-response and determines whether to transmit the notification message to the other device, by applying the selected data to the data recognition model. The recognition result providing unit 1320-4 provides a recognition result based on a data recognition purpose. The recognition result providing unit 1320-4 applies the selected data to the data recognition model by using data selected by the recognition data selecting unit 1320-3 as an input value. The recognition result may be determined by the data recognition model.

For example, a recognition result of data may be provided in the form of a text, audio, video, an image, and/or an instruction (e.g., an application execution instruction, a module function execution instruction, etc.). The recognition result providing unit 1320-4 applies user's biometric signal data to the data recognition model and provides a recognition result of the data. For example, the recognition result may be user's state information, etc. For example, the recognition result providing unit 1320-4 may provide, as user's state information, state information of the user who does not accept the call request such as exercising', 'emergency', resting', 'at table', sleeping', etc., in the form of a text, voice, a moving image, an image, a command, etc.

The model updating unit 1320-5 updates the data recognition model based on evaluation with respect to the recognition result provided by the recognition result providing unit 1320-4. For example, the model updating unit 1320-5 provides the recognition result provided by the recognition result providing unit 1320-4 to the model learning unit 1310-4, allowing the model learning unit 1310-4 to update the data recognition model.

At least one of the data obtaining unit 1320-1, the pre-processing unit 1320-2, the recognition data selecting unit 1320-3, the recognition result providing unit 1320-4, and the model updating unit 1320-5 may be manufactured in the form of at least one hardware chip and mounted on the electronic device. For example, at least one of the data obtaining unit 1320-1, the pre-processing unit 1320-2, the recognition data selecting unit 1320-3, the recognition result providing unit 1320-4, and the model updating unit 1320-5 may be manufactured in the form of a dedicated hardware chip for AI, or may be manufactured as a part of an existing general-purpose processor (e.g., a CPU or an application processor) or a dedicated graphic processor (e.g., a GPU) and mounted on various electronic devices.

The data obtaining unit 1320-1, the pre-processing unit 1320-2, the recognition data selecting unit 1320-3, the recognition result providing unit 1320-4, and the model updating unit 1320-5 may be mounted on one electronic device or on separate electronic devices, respectively. For example, some of the data obtaining unit 1320-1, the pre-processing unit 1320-2, the recognition data selecting unit 1320-3, the recognition result providing unit 1320-4, and the model updating unit 1320-5 may be included in the electronic device or some others thereof may be included in a server.

At least one of the data obtaining unit 1320-1, the pre-processing unit 1320-2, the recognition data selecting unit 1320-3, the recognition result providing unit 1320-4, and the model updating unit 1320-5 may be implemented with a software module. When at least one of the data obtaining unit 1320-1, the pre-processing unit 1320-2, the recognition data selecting unit 1320-3, the recognition result providing unit 1320-4, and the model updating unit 1320-5 is implemented with a software module (or a program module including an instruction), the software module may be stored in a non-transitory computer-readable medium. In this case, at least one software module is provided by an operating system (OS) or by an application. Alternatively, a part of the at least one software module may be provided by an OS and another part thereof may be provided by an application.

Figure 13:
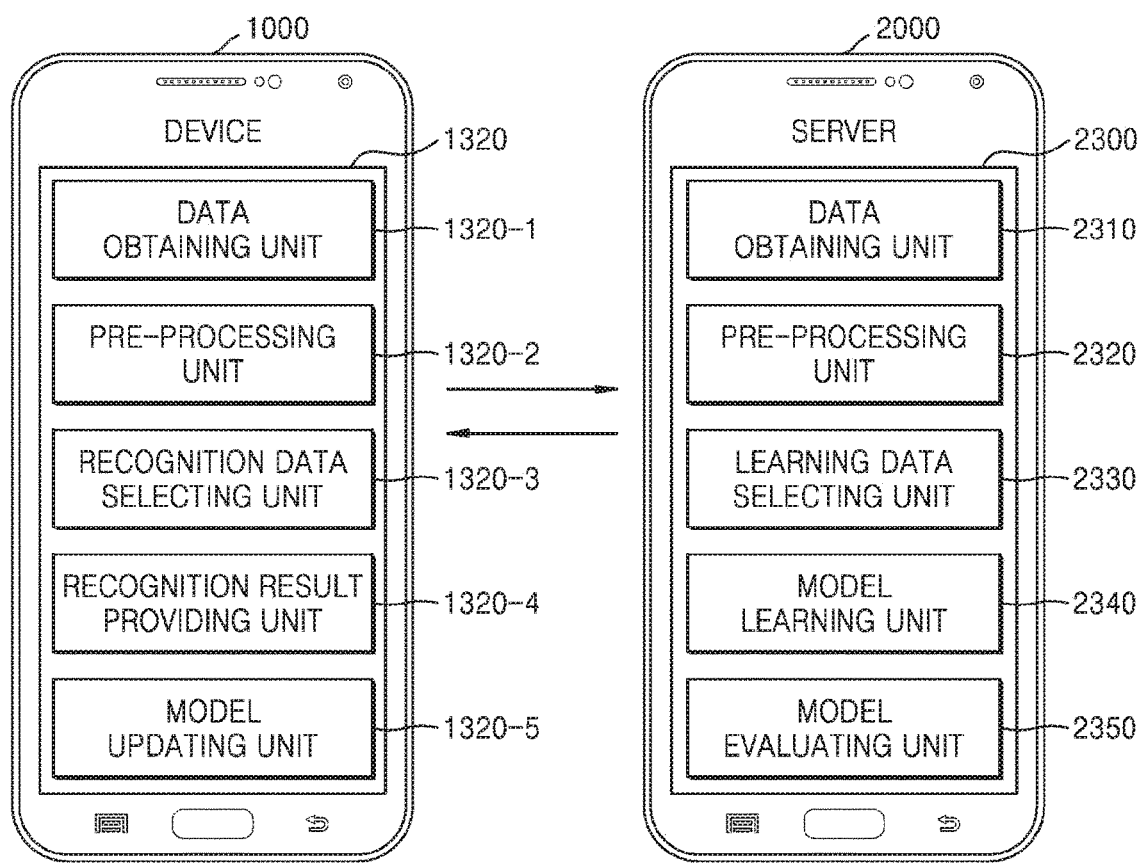
FIG. 13 illustrates an example where a device and a server learn and recognize data by interworking with each other, according to an embodiment.

FIG. 13 illustrates an example where the device 1000 and the server 2000 learn and recognize data by interworking with each other, according to an example embodiment.

Referring to FIG. 13, the server 2000 learns a criterion for generating the notification message describing the reason for the non-response and determining by the device 1000 whether to transmit the notification message to the other device. The device 1000 generates the notification message and determines whether to transmit the notification message to the other device based at least on the learning result of the server 2000.

In this case, a model learning unit 2340 of the server 2000 performs functions of the data learning unit 1310 shown in FIG. 11. The model learning unit 2340 of the server 2000 learns a criterion for determining which data is to be used to generate a notification message describing a predetermined reason for a non-response and to determine whether to transmit the notification message to the other device, and a criterion about how to determine which reason is to be described in the notification message and whether to transmit the notification message to the other device by using the data. The model learning unit 2340 obtains data to be used for learning and applies the obtained data to a data recognition model to be described later, thereby learning the criterion for generating the notification message describing the reason for the non-response and determining whether to transmit the notification message to the other device.

The recognition result providing unit 1320-4 of the device 1000 generates the notification message describing the reason for the non-response and determines whether to transmit the notification message to the other device, by applying the data selected by the recognition data selecting unit 1320-3 to the data recognition model generated by the server 2000. For example, the recognition result providing unit 1320-4 may transmit the data selected by the recognition data selecting unit 1320-3 to the server 2000 and request the server 2000 to generate the notification message describing the reason for the non-response and to determine whether to transmit the notification message to the other device by applying the data selected by the recognition data selecting unit 1320-3 to the recognition model. The recognition result providing unit 1320-4 receives information about generating the notification message describing the reason for the non-response determined by the server 2000 and determining whether to transmit the generated notification message to the other device from the server 2000.

The recognition result providing unit 1320-4 of the device 1000 receives the recognition model generated by the server 2000 and generates the notification message describing the reason for the non-response and transmits the notification message to the other device by using the received recognition model. In this case, the recognition result providing unit 1320-4 of the device 1000 generates the notification message describing the reason for the non-response and determines whether to transmit the notification message to the other device, by applying the data selected by the recognition data selecting unit 1320-3 to the data recognition model received from the server 2000.

Some embodiments may be implemented with a recording medium including a computer-executable command such as a computer-executable programming module. A computer-readable recording medium may be an available medium that is accessible by a computer, and includes all of a volatile medium, a non-volatile medium, a separated medium, and a non-separated medium. The computer-readable recording medium may also include a computer storage medium. The computer storage medium includes all of a volatile medium, a non-volatile medium, a separated medium, and a non-separated medium, which is implemented by a method or technique for storing information such as a computer-readable command, a data structure, a programming module, or other data.

In the specification, the term "unit" may be a hardware component like a processor or a circuit, and/or a software component executed by a hardware component like a processor.

Those of ordinary skill in the art to which the present disclosure pertains will appreciate that the present disclosure may be implemented in different detailed ways without departing from the technical spirit or essential characteristics of the present disclosure. Accordingly, the aforementioned embodiments should be construed as being only illustrative, but should not be constructed as being restrictive from all aspects. For example, each element described as a single type may be implemented in a distributed manner, and likewise, elements described as being distributed may be implemented as a coupled type.

The scope of the present disclosure is defined by the following claims rather than the detailed description, and the meanings and scope of the claims and all changes or modified forms derived from their equivalents should be construed as falling within the scope of the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
a memory having stored therein at least one program;
a communicator, including communication circuitry, configured to receive a call request from another device; and
at least one processor configured to provide a notification message about the call request by executing the at least one program,
wherein the at least one program comprises instructions for executing operations of:
obtaining context information about a situation of a user of the electronic device if a user input accepting the received call request is not received within a preset time;
determining a reason for a non-response of the user at least by analyzing the obtained context information;
obtaining information about a relationship between the user and another user of the other device;
generating a notification message describing the reason for the non-response based at least on the context information;
determining whether to transmit the notification message describing the reason for the non-response or not to transmit any message to the other device based on the reason for the non-response and the information about the relationship; and
transmitting the notification message to the other device when it is determined to transmit the notification message describing the reason for the non-response, and transmitting no message when it is determined not to transmit any message based on the determining of whether to transmit the notification message to the other device.

2. The device of claim 1, wherein the determining of whether to transmit the notification message to the other device is based on a type of the reason for the non-response and the information about the relationship.

3. The device of claim 2, wherein the obtaining of the information about the relationship between the user and the other user of the other device comprises:
obtaining intimacy information of the relationship; and
obtaining type information of the relationship, and
the determining of whether to transmit the notification message to the other device is based at least on the type of the reason for the non-response, the intimacy information of the relationship, and the type information of the relationship.

4. The device of claim 1, wherein the transmitting of the notification message to the other device comprises transmitting a preset message that does not include the reason for the non-response to the other device if it is determined not to transmit the notification message to the other device.

5. The device of claim 1, wherein a tone of the notification message is determined based on the obtained information about the relationship.

6. The device of claim 1, wherein the generating of the notification message comprises:
determining a time when a user input accepting the call request is able to be received, by analyzing the context information; and
generating the notification message describing the reason for the non-response based on the determined time.

7. The device of claim 1, wherein the determining of the reason for the non-response of the user comprises determining a type of the reason for the non-response by analyzing the obtained context information.

8. The device of claim 1, wherein the context information comprises at least one of schedule information of the user, use history information about the user's use of the device, state information of the user sensed by the device, state information of the user sensed by another device of the user, and state information of the device.

9. The device of claim 1, wherein the information about the relationship comprises at least one of call history information of the user, text history information of the user, contact information of the user, and schedule information of the user.

10. A method, performed by a device, of providing a notification message about a call request, the method comprising:
receiving the call request from another device;
obtaining context information about a situation of a user of the device if a user input accepting the received call request is not received within a preset time;
determining a reason for a non-response of the user by at least analyzing the obtained context information;
obtaining information about a relationship between the user and another user of the other device;
generating a notification message describing the reason for the non-response based at least on the context information;
determining whether to transmit the notification message describing the reason for the non-response or not to transmit any message to the other device based on the reason for the non-response and the information about the relationship; and
transmitting the notification message to the other device when it is determined to transmit the notification message describing the reason for the non-response, and transmitting no message when it is determined not to transmit any message based on the determining of whether to transmit the notification message to the other device.

11. The method of claim 10, wherein the determining of whether to transmit the notification message to the other device is based on a type of the reason for the non-response and the information about the relationship.

12. The method of claim 11, wherein the obtaining of the information about the relationship between the user and the other user of the other device comprises:

obtaining intimacy information of the relationship; and obtaining type information of the relationship, and wherein the determining of whether to transmit the notification message to the other device is based at least on the type of the reason for the non-response, the intimacy information of the relationship, and the type information of the relationship.

13. The method of claim 10, wherein the transmitting of the notification message to the other device comprises transmitting a preset message that does not include the reason for the non-response to the other device if it is determined not to transmit the notification message to the other device.

14. The method of claim 10, wherein a tone of the notification message is determined based on the obtained information about the relationship.

15. The method of claim 10, wherein the generating of the notification message comprises:

determining a time when a user input accepting the call request is able to be received, by analyzing the context information; and generating the notification message describing the reason for the non-response based on the determined time.

16. The method of claim 10, wherein the context information comprises at least one of schedule information of the user, use history information about the user's use of the device, state information of the user sensed by the device, state information of the user sensed by another device of the user, and state information of the device.

17. The method of claim 10, wherein the information about the relationship comprises at least one of call history information of the user, text history information of the user, contact information of the user, and schedule information of the user.

18. A non-transitory computer-readable recording medium having recorded thereon a program for executing the method of claim 10 on a computer.

* * * * *